(12) United States Patent
Ishii et al.

(10) Patent No.: US 8,014,808 B2
(45) Date of Patent: Sep. 6, 2011

(54) RADIO COMMUNICATION CONTROL SYSTEM, RADIO BASE STATION AND RADIO COMMUNICATION CONTROL METHOD

(75) Inventors: Hiroyuki Ishii, Yokosuka (JP); Akihito Hanaki, Yokohama (JP); Tomoki Sao, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 173 days.

(21) Appl. No.: 11/911,607

(22) PCT Filed: Apr. 12, 2006

(86) PCT No.: PCT/JP2006/307750
§ 371 (c)(1),
(2), (4) Date: Dec. 4, 2008

(87) PCT Pub. No.: WO2006/112329
PCT Pub. Date: Oct. 26, 2006

(65) Prior Publication Data
US 2009/0215484 A1    Aug. 27, 2009

(30) Foreign Application Priority Data
Apr. 15, 2005 (JP) .................................. 2005-119031

(51) Int. Cl.
*H04B 7/00* (2006.01)
(52) U.S. Cl. ..... 455/522; 455/69; 455/127.1; 455/452.1
(58) Field of Classification Search .................. 455/522, 455/69, 70, 126, 127.1, 68, 67.11, 13.4, 452.1, 455/452.2, 127.5; 370/318
See application file for complete search history.

(56) References Cited

U.S. PATENT DOCUMENTS

| 6,330,455 | B1 * | 12/2001 | Ichihara ......................... 455/522 |
| 7,680,072 | B2 * | 3/2010 | Ishii et al. ...................... 370/318 |
| 7,684,760 | B2 * | 3/2010 | Kwak .............................. 455/69 |
| 2002/0115464 | A1 * | 8/2002 | Hwang et al. ................. 455/522 |
| 2004/0202104 | A1 | 10/2004 | Ishii et al. |
| 2006/0172758 | A1 | 8/2006 | Ishii et al. |

FOREIGN PATENT DOCUMENTS

| CN | 1536781 | 10/2004 |
| EP | 1 467 500 A2 | 10/2004 |
| JP | 2003-143069 | 5/2003 |
| JP | 2004-88696 | 3/2004 |
| JP | 2004-312530 | 11/2004 |
| JP | 2005-80080 | 3/2005 |

OTHER PUBLICATIONS

U.S. Appl. No. 11/911,596, filed Oct. 15, 2007, Ishii, et al.

(Continued)

*Primary Examiner* — John Lee
(74) *Attorney, Agent, or Firm* — Oblon, Spivak, McClelland, Maier & Neustadt, L.L.P.

(57) ABSTRACT

A radio communication control system controlling a transmission power of a shared control channel for transmitting a control signal to a plurality of mobile stations. The system includes a transmission power lower limit value setting section configured to set a lower limit value of the transmission power of the shared control channel, and to set the transmission power of the shared control channel at the lower limit value when the transmission power of the shared control channel is lower than the lower limit value.

14 Claims, 3 Drawing Sheets

OTHER PUBLICATIONS

3rd Generation Partnership Project; Technical Specification Group Radio Access Network; Multiplexing and channel coding (FDD), 3GPP TS 25.212, Jun. 2005, pp. 1-72.

Office Action issued Nov. 30, 2010, in Japanese Patent Application No. 2005-119031.

Chinese Official Action issued Mar. 4, 2011 in counterpart Chinese Application 200680012364.5 (with English translation).

* cited by examiner

RADIO COMMUNICATION CONTROL SYSTEM, RADIO BASE STATION AND RADIO COMMUNICATION CONTROL METHOD

TECHNICAL FIELD

The present invention relates to a radio communication control system, a radio base station and a radio communication control method.

BACKGROUND ART

Recently, an "HSDPA (High Speed Downlink Packet Access) system" has been specified as a radio communication control system (see, for example, "3rd Generation Partnership Project" on the Internet <http://3gpp.org>). The HSDPA system is a higher speed packet transmission system for a downlink transmission in IMT-2000. The HSDPA system has purposes of achieving a higher peak transmission rate, a lower transmission delay, and a higher throughput and the like.

The HSPDA system is a transmission system for performing communications by sharing one physical channel among a plurality of mobile stations in a time-division. The HSDPA system allocates a channel to a mobile station of better radio quality at each moment. Thus, it is possible to improve the throughput of the entire system.

In order to perform communications by sharing one physical channel among a plurality of mobile stations in a time-division as described above, the mobile stations to perform communication by using the physical channel in each TTI (Transmission Time Interval) must be notified. In the case of the HSDPA system, the notification is made to the plurality of mobile stations by using a shared control channel called HS-SCCH (High Speed-Shared Control Channel).

In this regard, disclosed is a method in which a radio base station sets a transmission power to be allocated to the HS-SCCH, by adding an offset to an A-SPCH (Associated-Dedicated Physical Channel). The A-DPCH is dedicatedly set to each of the mobile stations (see, for example, Japanese Patent Application Laid-open Publication No. 2004-312530). The Japanese Patent Application Laid-open Publication No. 2004-312530 describes that the offset value is controlled in accordance with a communication quality (e.g., a block error rate) of the HS-SCCH. For example, when the required block error rate of the HS-SCCH is 1%, the invention of Japanese Patent Application Laid-open Publication No. 2004-312530 controls the offset value by an outer loop so that the block error rate of the HS-SCCH becomes 1%.

The HS-SCCH is a downlink control channel in the HSDPA, and is a channel for performing a signaling relating to information of the HS-PDSCH (an HS-DSCH as a transport channel) that is transmitted 2 slots after the transmission of the HS-SCCH (see, for example, 3GPP, TS25.211). Here, the information relating to the HS-DSCH includes; an ID of the mobile station to which the HS-DSCH is transmitted, transmission format information, (that is, a channelization code, a modulation scheme) a transport block size, Redundancy Version parameters in H-ARQ, or the like. (see, for example, 3GPP, TS25.212). Accordingly, when the mobile station assigned to the HS-SCCH and the HS-DSCH in the TTI fails to correctly receive the HS-SCCH (i.e., when an error occurs in a demodulation or a decoding of the HS-SCCH), the mobile station cannot receive the information of the HS-SCCH, and hence, does not receive the HS-DSCH.

Meanwhile, since an H-ARQ is performed in the HSDPA, when the mobile station receives the HS-SCCH and the HS-DSCH, the mobile station transmits a decoding result (OK/NG) to the radio base station at a predetermined timing, by using the HS-DPCCH. Here, the HS-DPCCH is an HSDPA control channel in the uplink. Accordingly, when the mobile station fails to decode the HS-SCCH, the mobile station does not transmit the HS-DPCCH at the predetermined timing.

However, since the radio base station has transmitted the HS-SCCH and the HS-DSCH to the mobile station, the radio base station attempts to receive the HS-DPCCH. In such a case, the radio base station determines, with a certain probability, the untransmitted HS-DPCCH as being transmitted, and detects an ACK or a NACK, which are transmission acknowledgment information. When the ACK is detected, the radio base station determines that the HS-DSCH has been received correctly at the mobile station despite the fact that the HS-DSCH has not been received correctly at the mobile station. Then, the radio base station passes the data mapped to the HS-DSCH to an upper layer, and starts a transmission of the next data. This means, in other words, a retransmission in the upper layer occurs.

In other words, when the error in the HS-SCCH occurs, the retransmission in the upper layer may occur. In addition, it is generally known that the retransmission in the upper layer affects a throughput in the HSDPA prominently when a higher throughput rate is achieved.

As mentioned above, according to a method for controlling the transmission power of the HS-SCCH described in Japanese Patent Application Laid-open Publication No. 2004-312530, the transmission power of the HS-SCCH is controlled so that the error rate of the HS-SCCH has a constant value, regardless of being at the edge of a cell or at the center of the cell, or moving at a low rate or at a high rate.

However, there have been problems that the error in the HS-SCCH may lead to the retransmission in the upper layer, and that the retransmission in the upper layer may cause a deterioration of the throughput characteristics in the HSDPA, especially in the environment where the high throughput rate is achievable in the HSDPA.

In view of the above problems, an object of the present invention is to provide a radio communication control system, a radio base station and a radio communication control method that makes it possible to achieve a more stable and higher transmission rate by setting the quality of the HS-SCCH higher, in the environment where the high throughput rate is achievable in the HSDPA.

DISCLOSURE OF THE INVENTION

In order to achieve the above object, a first aspect of the present invention is summarized as a radio communication control system controlling a transmission power of a shared control channel for transmitting a control signal to a plurality of mobile stations, including; a transmission power lower limit value setting section configured to set a lower limit value of the transmission power of the shared control channel, and to set the transmission power of the shared control channel at the lower limit value when the transmission power of the shared control channel is lower than the lower limit value.

According to the radio communication control system of the first aspect, it is possible to achieve a more stable and higher transmission rate by setting the lower limit value of the transmission power of the HS-SCCH, in an environment where a high throughput rate is achievable in an HSDPA.

Further, the transmission power lower limit value setting section may control the transmission power of the shared control channel by adding an offset to a transmission power of a dedicated channel to be transmitted dedicatedly to each of the plurality of mobile stations.

In addition, the transmission power lower limit value setting section may control the offset in accordance with a quality of the shared control channel.

Moreover, the quality of the shared control channel is a block error rate of the shared control channel.

Furthermore, the transmission power lower limit value setting section may set the lower limit value according to any one of a service type, a contract type, a receiver type, a cell type, and a priority class type, of each of the plurality of mobile stations.

Still furthermore, the receiver type may be a type according to a RAKE receiver, an equalizer, a receive diversity, an interference canceller, a maximum transmission rate, or a receivable maximum number of codes.

A second aspect of the present invention is summarized as a radio base station controlling a transmission power of a shared control channel for transmitting a control signal to a plurality of mobile stations, including: a transmission power lower limit value setting section configured to set a lower limit value of the transmission power of the shared control channel, and to set the transmission power of the shared control channel at the lower limit value when the transmission power of the shared control channel is lower than the lower limit value.

According to the radio base station of the second aspect, it is possible to achieve a more stable and higher transmission rate by setting the lower limit value of the transmission power of the HS-SCCH, in an environment where a high throughput rate is achievable in an HSDPA.

A third aspect of the present invention is summarized as a radio communication control method controlling a transmission power of a shared control channel for transmitting a control signal to a plurality of mobile stations, including: setting a lower limit value of the transmission power of the shared control channel, and setting the transmission power of the shared control channel at the lower limit value when the transmission power of the shared control channel is lower than the lower limit value.

According to the radio communication control method of the third aspect, it is possible to achieve a more stable and higher transmission rate by setting the lower limit value of the transmission power of the HS-SCCH, in an environment where a high throughput rate is achievable in an HSDPA.

BEST MODES FOR CARRYING OUT THE INVENTION

Figure 1:
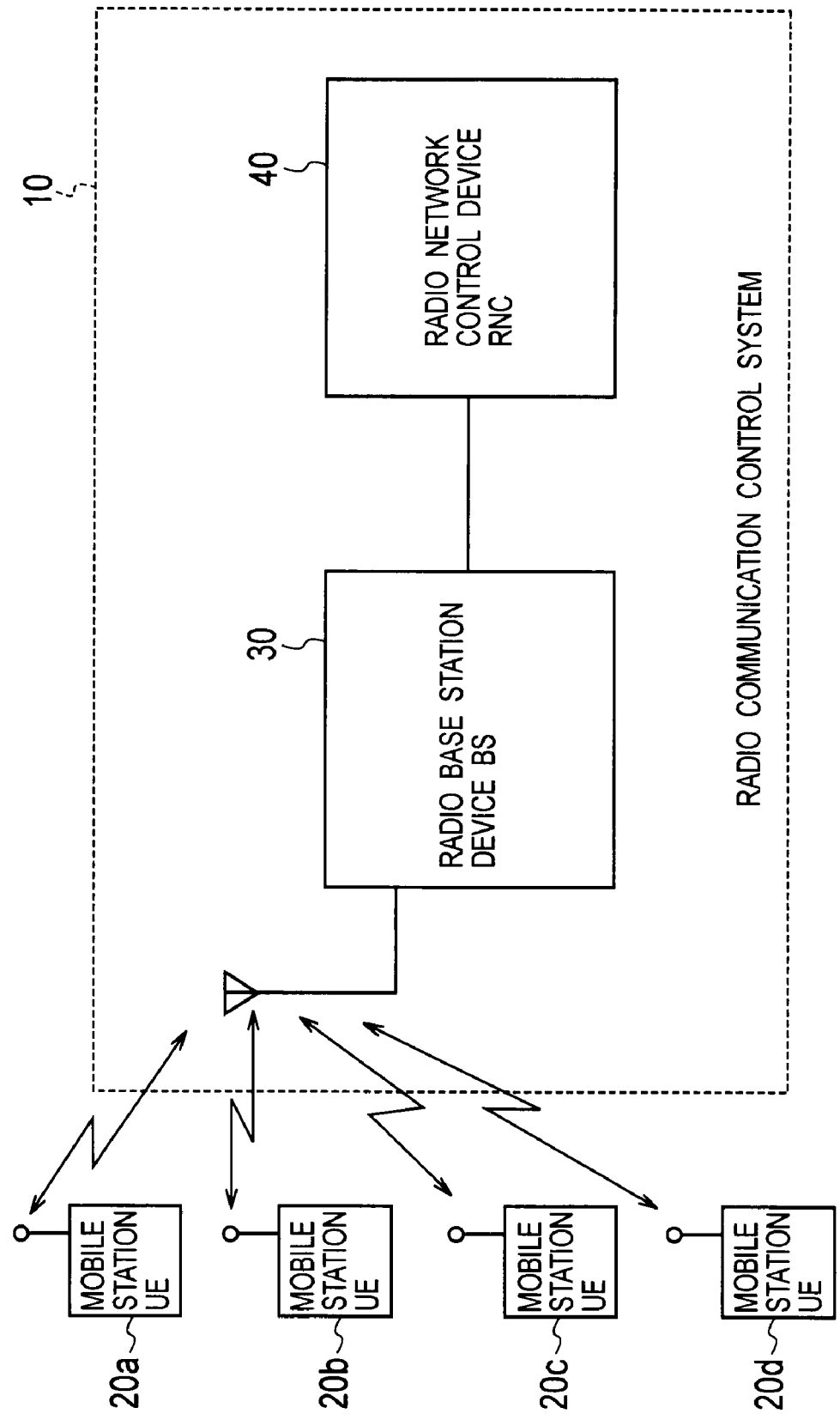
FIG. 1 is a configuration diagram of an entire radio communication control system according to an embodiment.

Hereinafter, a description will be given of embodiments of the present invention with reference to the drawings. The same or similar reference numerals are given to the same or similar portions in the drawings below. Note that the drawings are expressed schematically.
(Configuration of Radio Communication Control System)

A description will be given of a configuration of a radio communication control system according to an embodiment of the present invention with reference to FIGS. 1 and 2.

A configuration diagram of an entire radio communication control system 10 according to the embodiment is shown in FIG. 1. As shown in FIG. 1, the radio communication control system 10 according to the embodiment is provided with a radio base station device BS30 wirelessly connected to a plurality of mobile stations UE20a, 20b, 20c and 20d, and a radio network control device RNC40 controlling the radio base station device BS30. Incidentally, the number of mobile stations performing radio communication with the radio base station device BS is set at "4" in the present embodiment, but may be other than "4".

In addition, although the description is given of the case where the radio communication control system includes the radio base station device BS30 and the radio network control device RNC40 in the embodiment, the present invention is not limited thereto. The present invention is also applicable to a case where the radio communication control system 10 includes only of the radio base station device BS30, or a case where the radio communication control system 10 includes only the radio network control device RNC40.

Furthermore, the radio communication control system 10 according to the embodiment controls a new transmission power of a shared control channel (hereinafter referred to as HS-SCCH) for transmitting control signals to the plurality of mobile stations UE20a, 20b, 20c and 20d, when the HSDPA system is applied in the IMT-2000 system which uses a W-CDMA system.

Here, the mobile stations UE20a, 20b, 20c and 20d are configured to perform radio communications with the base station BS30 by using the HSDPA system. Each mobile station reports a transmission power control command (TPC command) for controlling a transmission power of a dedicated channel (hereinafter referred to as A-DPCH) accompanying the HS-channels, to the base station BS30 by using an uplink.

Figure 2:
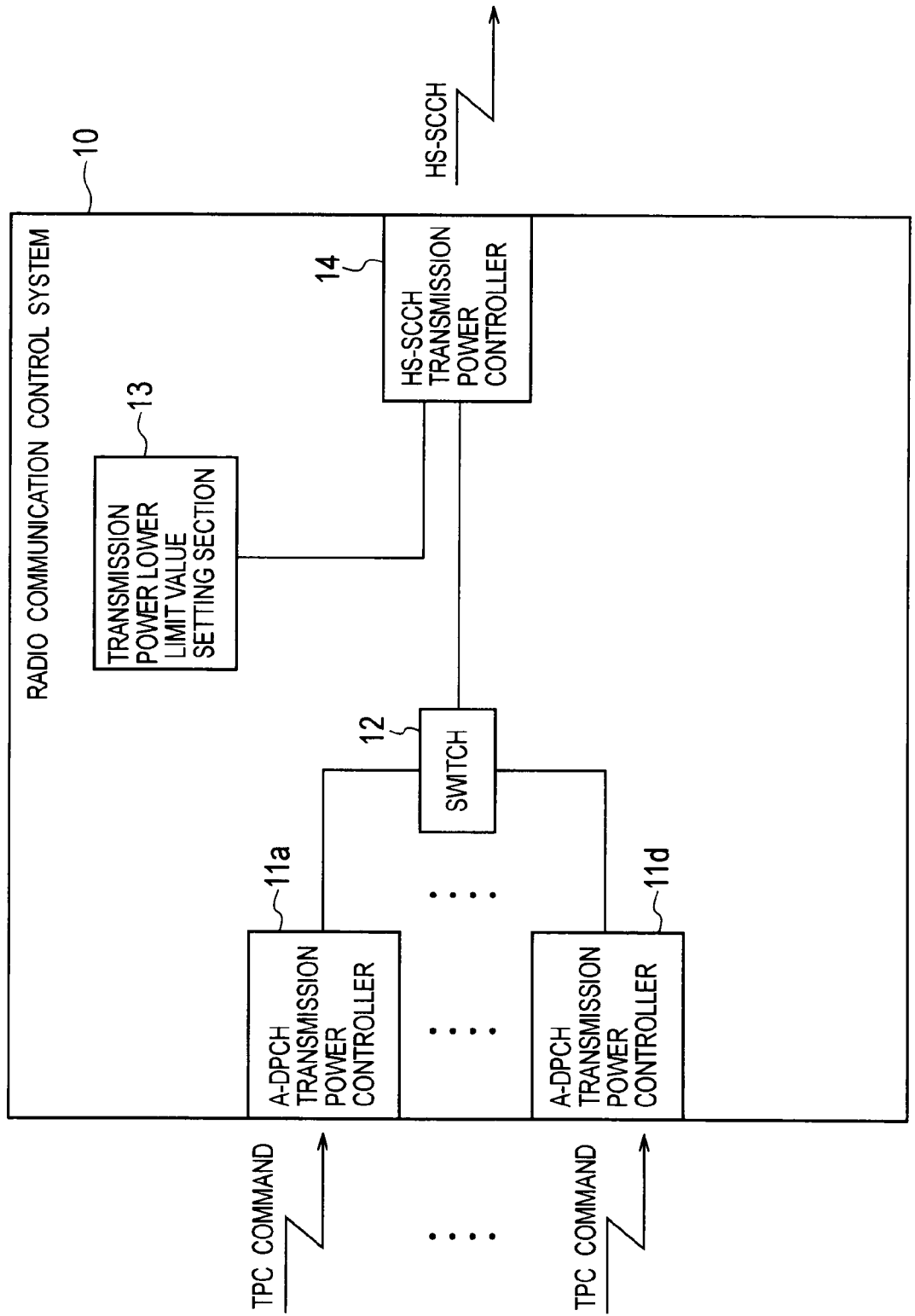
FIG. 2 is a functional block diagram of the radio communication control system according to the embodiment.

As shown in FIG. 2, the radio communication control system 10 according to the embodiment is provided with a plurality of A-DPCH transmission power controllers 11a, 11b, 11c and 11d; a switch 12, a transmission power lower limit value setting section 13, and an HS-SCCH transmission power controller 14. Incidentally, FIG. 2 only describes the sections for controlling and setting the transmission power of the HS-SCCH, in the radio communication control system 10.

The A-DPCH transmission power controllers 11a, 11b, 11c and 11d are provided for each of the mobile stations UE20a, 20b, 20c and 20d, respectively. The A-DPCH transmission power controllers 11a, 11b, 11c and 11d control the transmission power of the corresponding mobile station UE20a, 20b, 20c or 20d by using a transmission power control command transmitted from the corresponding mobile station UE20a, 20b, 20c or 20d, respectively.

In each TTI, the switch 12 is configured to transmit, to the HS-SCCH transmission power controller 14, the transmission power of the A-DPCH of the mobile station UE scheduled to be assigned to the HS-SCCH and the HS-PDSCH (or HS-DSCH, as a transport channel), together with identification information of the mobile station UE.

The transmission power lower limit value setting section 13 sets the lower limit value of the transmission power of the HS-SCCH, and notifies the set lower limit value of the transmission power of the HS-SCCH to the HS-SCCH transmission power controller 14.

Further, the lower limit value of the transmission power of the HS-SCCH can be set according to a service type, a contract type, a receiver type (a RAKE receiver, an equalizer, a receive diversity, an interference canceller and capabilities of the UE (an index that is classified according to a receivable modulation scheme, a receivable maximum number of codes or a receivable maximum number of bits), or the like), a cell type, or a priority class type, of the mobile station.

For example, the transmission power lower limit value setting section 13 may set the lower limit value of the transmission power of the HS-SCCH at 25 dBm when a receivable maximum transmission rate of the mobile station is 3.6 Mbps, and may set the lower limit value of the transmission power of the HS-SCCH at 28 dBm when the receivable maximum transmission rate of the mobile station is 14.4 Mbps. In such a case, by setting the lower limit value of the transmission power of the HS-SCCH higher for the mobile station having a higher transmission rate, it is possible to maintain a high quality of the HS-SCCH for the mobile station having the higher transmission rate, and to achieve a higher transmission rate.

Alternatively, the transmission power lower limit value setting section 13 may set the lower limit value of the transmission power of the HS-SCCH at 29 dBm when the mobile station has a high priority class, and may set the lower limit value of the transmission power of the HS-SCCH at 24 dBm when the mobile station has a low priority class, for example. In such a case, by setting the lower limit value of the transmission power of the HS-SCCH higher for the mobile station having the high priority class, it is possible to maintain the high quality of the HS-SCCH for the mobile station having the high priority class, and to provide a higher quality communication.

Further, for example, the transmission power lower limit value setting section 13 may set the lower limit value of the transmission power of the HS-SCCH at 33 dBm when the service type of the mobile station is a streaming, and may set the lower limit value of the transmission power of the HS-SCCH at 27 dBm when the service type of the mobile station is a download using an FTP. In such a case, in a service that has a high immediacy, such as the streaming, the retransmission in the upper layer can be reduced by transmitting the HS-SCCH with a higher quality. On the other hand, in a service that has a low requirement for delay, such as the download using the FTP, a power resource can be used efficiently by transmitting the HS-SCCH with a slightly lower quality. Hence, it is possible to set an appropriate lower limit value of the transmission power of the HS-SCCH for each service type.

The HS-SCCH transmission power controller 14 sets the transmission power of the HS-SCCH of the mobile station UE scheduled to be assigned to the HS-SCCH and the HS-DSCH in the TTI.

For example, the HS-SCCH transmission power controller 14 sets the transmission power of the HS-SCCH in the TTI in accordance with the transmission power of the A-DPCH associated to the HS-SCCH, and the communication quality of the HS-SCCH. Specifically, the HS-SCCH transmission power controller 14 sets the transmission power by using the Equation (1) below, for example.

(transmission power of HS-SCCH)=(transmission power of A-DPCH)+(offset transmission power)   Equation (1)

Here, for example, the offset transmission power is controlled in accordance with the communication quality of the HS-SCCH by using an outer loop in the following manner.

First, the communication quality of the HS-SCCH can be estimated based on transmission acknowledgment information of the HS-DSCH, which is mapped to the HS-DPCCH. The HS-DPCCH is an HSDPA control channel in the uplink. Specifically, when the transmission acknowledgment information is an ACK or a NACK, this indicates that the HS-SCCH was correctly received, and consequently that a demodulation and a decoding of the HS-DSCH has been performed. When the transmission acknowledgment information is a DTX, this indicates that the HS-SCCH was not correctly received, and consequently that neither the demodulation nor the decoding of the HS-DSCH has been performed. Accordingly, when a target block error rate of the HS-SCCH is expressed as "$BLER_{target}$" and an arbitrary constant is expressed as "$\square$", the transmission power of the HS-SCCH can be controlled so that the block error rate of the HS-SCCH becomes the target block error rate, by using the following Equations:

When the transmission acknowledgment information is the ACK or the NACK;

$$\square(\text{offset power})=(\text{offset power})-\square \times BLER_{target}$$

When the transmission acknowledgment information is the DTX;

$$\square(\text{offset power})=(\text{offset power})+\square \times (1-BLER_{target})$$

Then, the HS-SCCH transmission power controller 14 controls the transmission power of the HS-SCCH by using the lower limit value of the transmission power of the HS-SCCH obtained from the transmission power lower limit value setting section 13, in the following manner. Specifically, when the transmission power of the HS-SCCH is lower than the lower limit value of the transmission power of the HS-SCCH, the transmission power of the HS-SCCH is set at the same value as the lower limit value of the transmission power of the HS-SCCH.

Hereinabove, a case has been described where the transmission power of the HS-SCCH is controlled in accordance with the transmission power of the A-DPCH and the communication quality of the HS-SCCH, and where a lower limitation is thereafter set to the transmission power of the HS-SCCH by using the lower limit value of the transmission power of the HS-SCCH. However, since the major point of the present invention is to set the lower limitation to the transmission power of the HS-SCCH, the method for controlling the transmission power of the HS-SCCH before setting the lower limitation on the transmission power may be a method other than the above. For example, as a control method other than the transmission power control method of the HS-SCCH using the transmission power of the A-DPCH and the communication quality of the HS-SCCH, conceivable is a transmission power control method using radio quality information CQI in a downlink, which is notified from the mobile station.

(Radio Communication Control Method)

Figure 3:
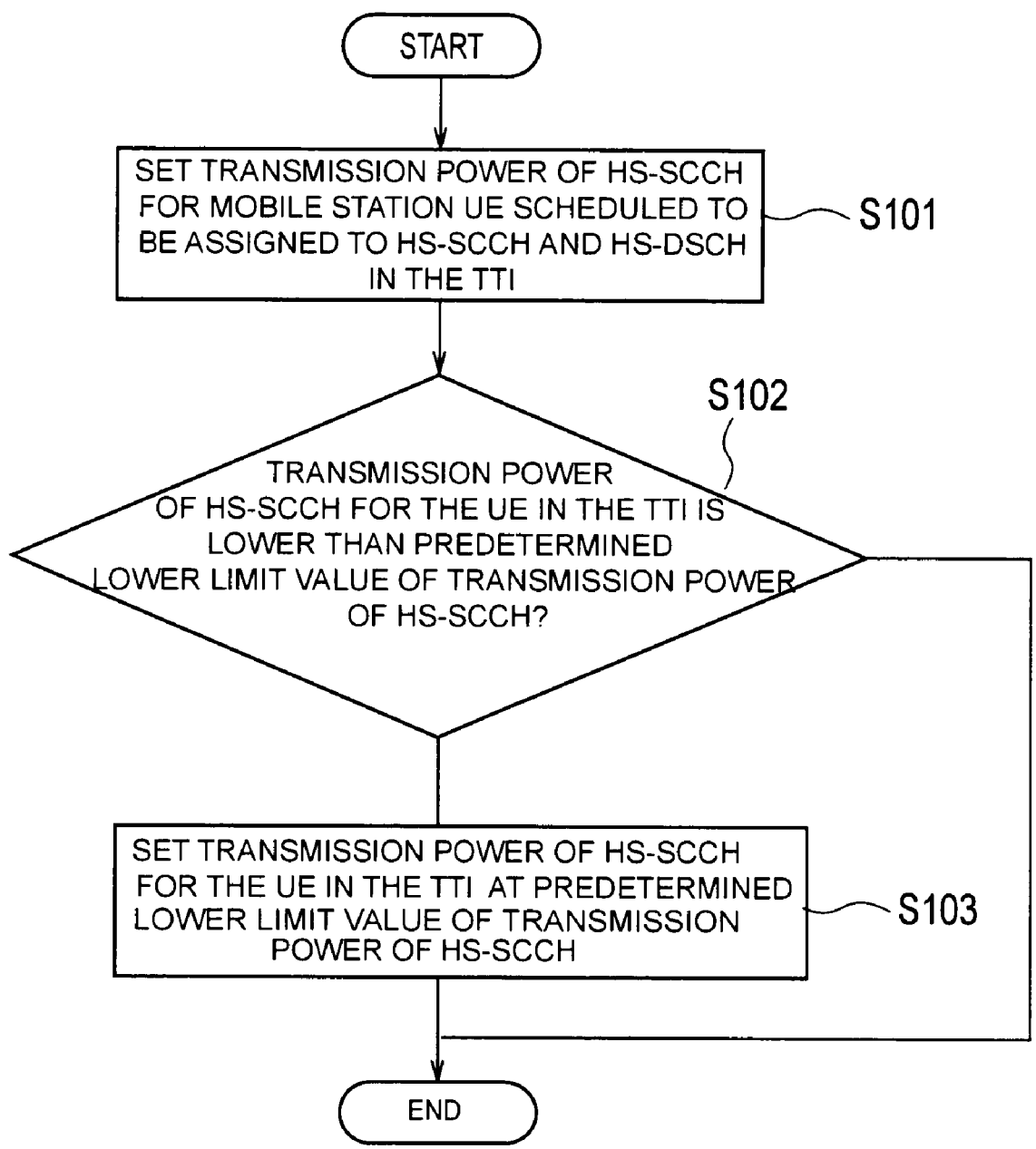
FIG. 3 is a flowchart illustrating a radio communication control method according to the embodiment.

Hereinafter, a description will be given of an operation of the radio communication control system 10 according to the present embodiment with reference to FIG. 3. FIG. 3 is a flowchart illustrating an example of an operation for controlling a transmission power of the HS-SCCH in the HSDPA system, applied in the IMT-2000 system which uses the W-CDMA system. Here, the power control is further performed by using the lower limit value.

First, in step S101, the HS-SCCH transmission power controller 14 sets the transmission power of the HS-SCCH of the mobile station UE scheduled to be assigned to the HS-SCCH and the HS-DSCH in a TTI.

Next, in step S102, the HS-SCCH transmission power controller 14 determines whether or not the transmission power of the HS-SCCH of the mobile station UE set in step S101 is lower than the lower limit value of the transmission power of the HS-SCCH set by the transmission power lower limit value setting section 13. When the transmission power of the HS-SCCH is lower than the lower limit value of the transmission power of the HS-SCCH, the processing advances to step S103. When the transmission power of the HS-SCCH is not lower than the lower limit value of the transmission power of the HS-SCCH, it is determined that the transmission power of the HS-SCCH does not need to be limited by the lower limit value, and hence, the processing is terminated.

Then, in step S103, the HS-SCCH transmission power controller 14 sets the transmission power of the HS-SCCH of the mobile station UE in the TTI at the same value as the lower limit value of the transmission power of the HS-SCCH.

It should be noted that the applicable range of the radio communication control system and the radio communication control method according to the present invention should not be limited to the HSDPA system, which is a high speed packet transmission system in the W-CDMA IMT-2000 system. The radio communication control system and the radio communication control method according to the present invention are also applicable to a high speed packet transmission system using a CDMA-TDD system, a CDMA2000 system, a 1xDEV-DO system or the like.

(Operations and Effects)

According to the radio communication control system 10 of the present embodiment, when the mobile station controls the shared control channel (the HS-SCCH), it is possible to set the quality of the HS-SCCH higher and to provide an HSDPA service having a more stable and higher transmission rate, in an environment where a high throughput rate is achievable in the HSDPA.

For example, when the transmission power, in which a 1% target error rate of the HS-SCCH is achievable, is 24 dBm in a certain part in the center of a cell, the HS-SCCH is transmitted at 27 dBm in this part by setting the lower limit value of the HS-SCCH at 27 dBm. As a result, the error rate of the HS-SCCH is made to be even smaller than 1%. Consequently, it is possible to provide an HSDPA service having a small retransmission probability in an upper layer, and further a more stable and higher transmission rate.

In addition, the transmission power of the shared control channel can be controlled by adding an offset to the transmission power of the dedicated channel to be transmitted dedicatedly to each of the mobile stations. Consequently, it is possible to control the transmission power more appropriately.

Moreover, the offset can be controlled in accordance with the quality of the shared control channel. Consequently, it is possible to set the quality of the shared control channel higher and to provide an HSDPA service having a more stable and higher transmission rate. Here, the quality of the shared control channel may be a block error rate of the shared control channel.

Furthermore, the transmission power lower limit value setting section 13 can set the lower limit value according to any one of a service type, a contract type, a receiver type, a cell type, and a priority class type, of the mobile station. Consequently, it is possible to set the transmission power appropriately in accordance with various applications. Additionally, the receiver type may be a type according to a RAKE receiver, an equalizer, a receive diversity, an interference canceller, a maximum transmission rate, or a receivable maximum number of codes.

Other Embodiments

Although the present invention has been described with the above embodiment, it is not to be understood that descriptions and drawings that constitute part of the present disclosure are intended to limit the invention. From this disclosure, various alternative embodiments, examples and operation techniques will be apparent to those skilled in the art.

For example, an explanation has been given of the radio communication control system 10 being configured of the radio base station device BS30 and the radio network control device RNC40 in FIG. 1. However, the respective configurations (the A-DPCH transmission power controllers 11a, 11b, 11c and 11d, the switch 12, the transmission power lower limit value setting section 13 and the HS-SCCH transmission power controller 14) shown in FIG. 2 may be located in the radio base station device BS30. Similarly, the respective constituent features (the A-DPCH transmission power controllers 11a, 11b, 11c and 11d, the switch 12, the transmission power lower limit value setting section 13 and the HS-SCCH transmission power controller 14) shown in FIG. 2 may be located in the radio network control device RNC40.

Thus, it is obvious that the present invention includes various embodiments and the like that are not described herein. Accordingly, the technical scope of the present invention is intended to be defined only by the claimed elements of the invention according to the scope of claims that is reasonably understood from the above descriptions.

INDUSTRIAL APPLICABILITY

As described above, the radio communication control system, the radio base station and the radio communication control method according to the present invention are useful for the techniques for achieving a more suitable and higher transmission rate.

What is claimed is:

1. A radio communication control system which performs a data communication by sharing a shared data channel among a plurality of mobile stations, comprising:
   a transmission power minimum value setting section configured to:
   (1) set a minimum value of a transmission power of a shared control channel for transmitting a control signal for the shared data channel when the transmission power of the shared control channel is controlled, and
   (2) set the transmission power of the shared control channel at the minimum value when the transmission power of the shared control channel is less than the minimum value so that a quality of the shared control channel becomes higher, at a center of a cell or in an environment where a high throughput rate is achievable, than a quality of the shared control channel when the transmission power is less than the minimum value.

2. The radio communication control system according to claim 1, wherein the transmission power minimum value setting section is further configured to control the transmission power of the shared control channel by adding an offset to a transmission power of a dedicated channel to be transmitted dedicatedly to each of the plurality of mobile stations.

3. The radio communication control system according to claim 2, wherein the transmission power minimum value setting section is further configured to control the offset in accordance with the quality of the shared control channel.

4. The radio communication control system according to claim 3, wherein the quality of the shared control channel is a block error rate of the shared control channel.

5. The radio communication control system according to claim 4, wherein the shared data channel is an HS-PDSCH, and the shared control channel is an HS-SCCH.

6. The radio communication control system according to claim 5, wherein the receiver type is a type according to a RAKE receiver, an equalizer, a receive diversity, an interference canceller, a maximum transmission rate, or a receivable maximum number of codes.

7. The radio communication control system according to claim 3, wherein the shared data channel is an HS-PDSCH, and the shared control channel is an HS-SCCH.

8. The radio communication control system according to claim 2, wherein the shared data channel is an HS-PDSCH, and the shared control channel is an HS-SCCH.

9. The radio communication control system according to claim 1, wherein the shared data channel is an HS-PDSCH, and the shared control channel is an HS-SCCH.

10. The radio communication control system according to claim 9, wherein the transmission power minimum value setting section is further configured to set the minimum value according to any one of a service type, a contract type, a receiver type, a cell type, and a priority class type, of each of the plurality of mobile stations.

11. The radio communication control system according to claim 1, wherein:
the transmission power minimum value setting section is further configured to control the transmission power of the shared control channel in accordance with the quality of the shared control channel so that a target value of the quality is achieved, and
the quality of the shared control channel, at the center of the cell or in the environment where the high throughput rate is achievable, is higher than the target value as a result of setting the transmission power of the shared control channel at the minimum value when the transmission power of the shared control channel is less than the minimum value.

12. The radio communication control system according to claim 11, wherein the target value of the quality of the shared control channel is a block error rate, and the quality increases as the block error rate decreases.

13. A radio base station in a radio communication control system which performs a data communication by sharing a shared data channel among a plurality of mobile stations, comprising:
a transmission power minimum value setting section configured to:
(1) set a minimum value of a transmission power of a shared control channel for transmitting a control signal for the shared data channel when the transmission power of the shared control channel is controlled, and
(2) set the transmission power of the shared control channel at the minimum value when the transmission power of the shared control channel is lower than the minimum value so that a quality of the shared control channel becomes higher, at a center of a cell or in an environment where a high throughput rate is achievable, than a quality of the shared control channel when the transmission power is less than the minimum value.

14. A radio communication control method in a radio communication control system which performs a data communication by sharing a shared data channel among a plurality of mobile stations, comprising:
setting a minimum value of a transmission power of a shared control channel for transmitting a control signal for the shared data channel when the transmission power of the shared control channel is controlled; and
setting the transmission power of the shared control channel at the minimum value when the transmission power of the shared control channel is lower than the minimum value so that a quality of the shared control channel becomes higher, at a center of a cell or in an environment where a high throughput rate is achievable, than a quality of the shared control channel when the transmission power is less than the minimum value.

* * * * *